Nov. 19, 1968 M. C. BAUM ET AL 3,412,304
MOTOR STOPPING AND REVERSING CIRCUITS
Filed Oct. 23, 1965 3 Sheets-Sheet 1

INVENTORS
Matthew C. Baum
Samuel Small
BY Cal Hein
Agent

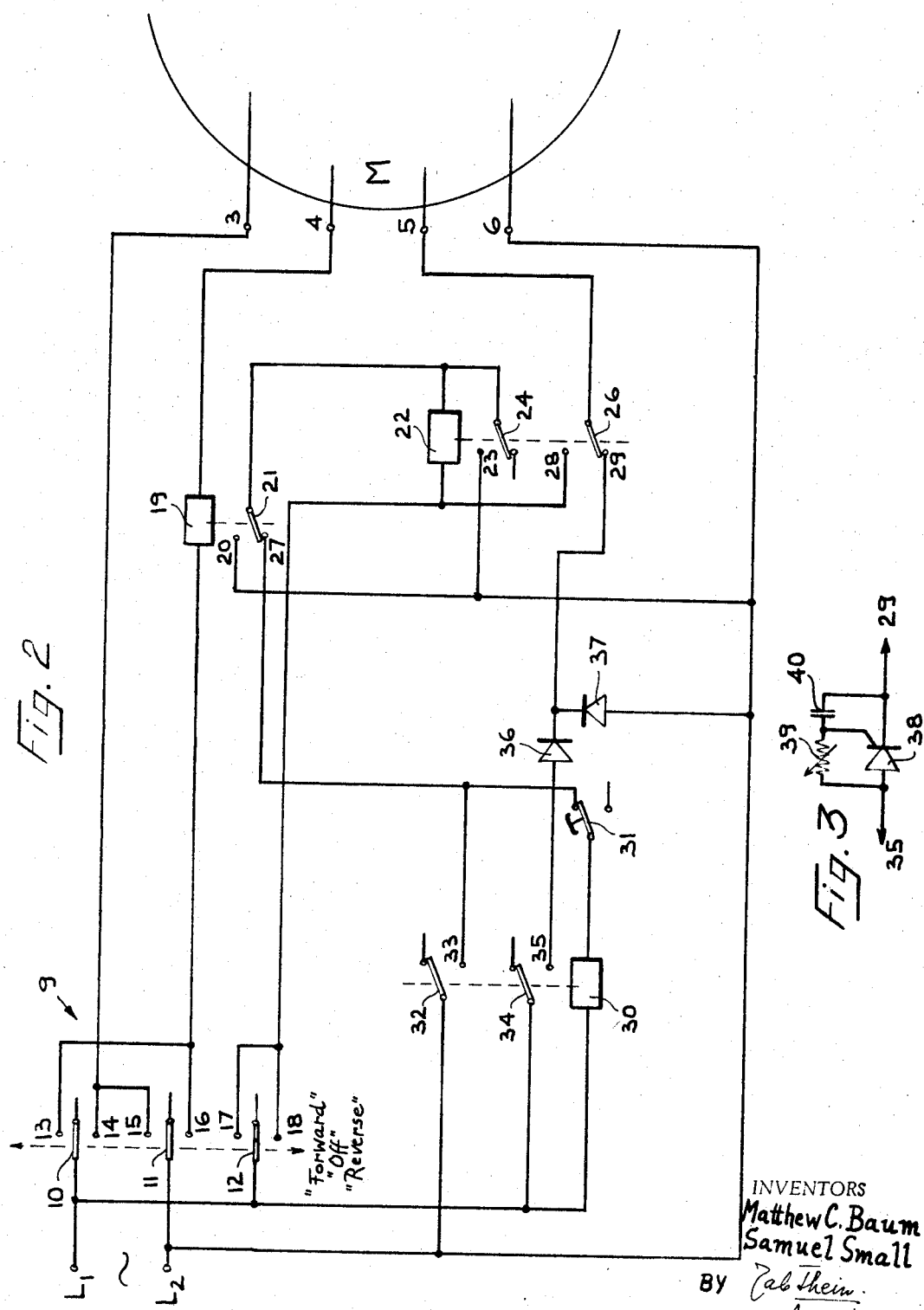

Nov. 19, 1968  M. C. BAUM ET AL  3,412,304
MOTOR STOPPING AND REVERSING CIRCUITS
Filed Oct. 23, 1965  3 Sheets-Sheet 3
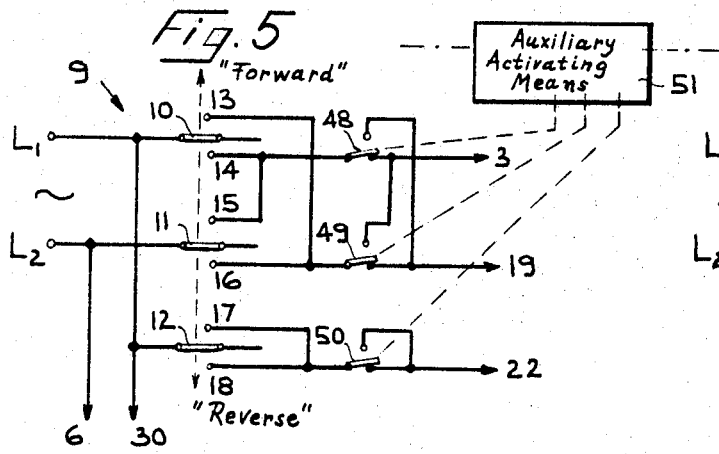
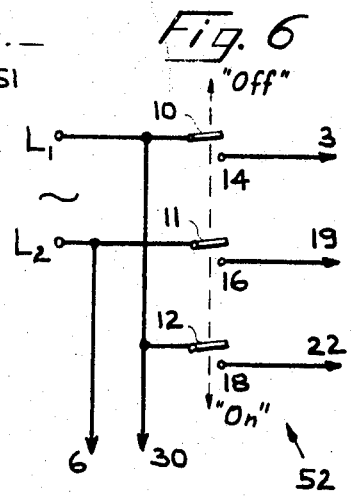
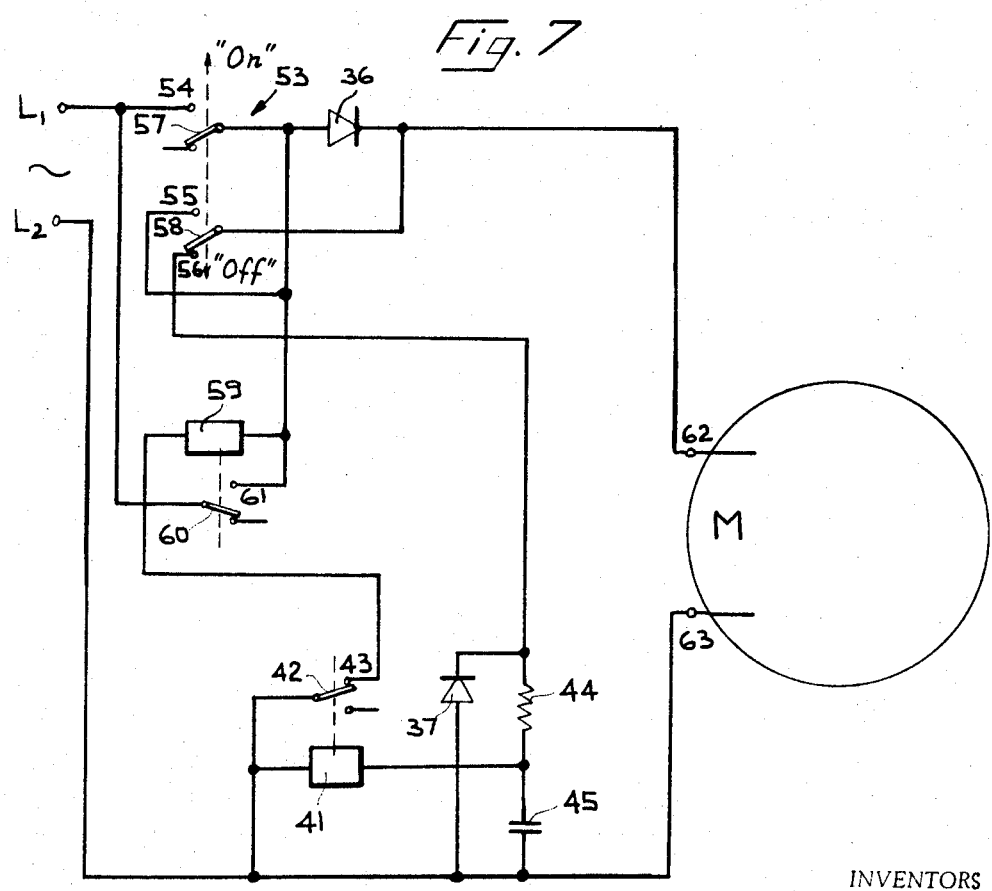
INVENTORS
Matthew C. Baum
Samuel Small
BY ?ab thein.
Agent United States Patent Office 3,412,304
Patented Nov. 19, 1968

3,412,304
MOTOR STOPPING AND REVERSING CIRCUITS
Matthew C. Baum, 210 W. 101st St., New York, N.Y. 10025, and Samuel Small, 920 Val Park Ave., Valley Stream, N.Y. 11580
Filed Oct. 23, 1965, Ser. No. 502,875
9 Claims. (Cl. 318—203)

ABSTRACT OF THE DISCLOSURE

Circuits for stopping and reversing, or only stopping, single-phase A.C. motors, particularly of the induction type, featuring current sensing means, preferably in the form of a relay, electrically associated with the conventional centrifugal switch or other starting device of the motor to be controlled. A ganged manual switch is provided, the only one to be actuated manually in the inventive control circuits, which co-ordinates the operative functions of the motor, such as its inoperative position and operative position; the latter may have "Forward" and "Reverse" positions in the embodiment which is suitable for reversing the motor rotation.

Active circuit elements, such as for example relays, are provided for connecting and disconnecting the current paths. One or more relays may have self-locking circuits. The D.C. required for braking and stopping the motor is derived from a diode or from a controlled rectifier. Special means may be provided for releasing the D.C.-connecting relay when a predetermined time period has elapsed. Auxiliary activating means are also contemplated which may be remote-controlled or motor-operated.

---

The present invention relates to single-phase motor control circuits, and more particularly to circuits serving for the efficient and safe braking or stopping of the motor, and also for the reversing of the motor rotation. The stopping feature may be accomplished in conjunction with or separately from the reversing action.

It is already known to use a D.C. current for braking A.C. motors. However, devices and circuits employed heretofore have been usually afflicted with drawbacks of circuitry and operation, making them unsuitable for widespread application. Contractors, capacitors and other electrical elements have been used in such devices with more or less effect. Some of the circuits have been adapted to three-phase motors only; the present invention, however, is concerned with single-phase A.C. motors, preferably of the induction type.

It is the object of the present invention to provide motor stopping and reversing circuits which are adapted to perform their functions safely, with a minimum of expenditure, and in a manner which does not require the motors to be altered or modified in any manner.

It is another object of the invention to provide a current-sensing relay in series with the starting winding, which conventionally has a speed-reactive centrifugal switch or other auxiliary starting device built into or associated with the motor.

It is yet another object of the invention to provide in the inventive circuit, a small number of self-locking relays which co-operate with a sole manually operated master switch in performing the stopping and reversing functions.

It is still another object to provide a simple time-delay circuit for disconnecting part of the circuit upon completion of a predetermined time period, corresponding to the normal stoppage of the motor.

Yet a further object of the invention provides auxiliary activating means, co-operating with the inventive motor control circuit, for remotely controlling its operation, or making the latter dependent upon extraneous conditions, including those of safety.

One of the major features of the invention provides a combination of switch means, preferably in the form of a relay, associated with the conventional centrifugal switch or other starting device of the motor to be controlled. All functions are derived from this switch means.

Another feature relates to the provision of a ganged manual switch, the only one to be manipulated in the novel circuit, which co-ordinates the functions, such as "Forward," "Reverse" and "Off." In an alternative embodiment, an "On-Off" switch may be sufficient, if the reversal is not one of the tasks of the circuitry.

The switch mentioned above is operatively connected with active circuit elements, such as relays, which act in connecting and disconnecting the current paths. One or more of these relays may have means for holding or self-locking; this, of course, may be electrical or mechanical, as is known in the art.

According to yet another novel feature, the D.C. required for braking and subsequently stopping the controlled motor is derived from a diode, or from a controlled rectifier, connected in series with the main or running winding of the motor. An additional diode may be shunted across the winding terminals, for absorbing the inductive reverse voltage produced when the line polarity reverses.

Special means may be provided for automatically releasing the D.C.-connecting relay or circuit element when a predetermined time period has elasped or a particular event has occurred. Although a particular resistor-capacitor combination will be described herein, acting in conjunction with a relay, other electrical or mechanical timing or time-delay means may be provided.

Another important feature of the invention relates to the optional provision of auxiliary activating means which may be remote-controlled, motor-operated, or provided to operate upon the occurrence of certain conditions. The D.C. braking cycle may, for instance, be initiated or terminated by a switch applied to a shaft driven by the motor under control.

A preferred exemplary embodiment of the motor control circuit according to the present invention features the above-mentioned switch, which may be of manual operation, a current-sensing device in the form of a relay, and a switching device triggered by the operation of the current-sensing device, for energizing at least one motor winding as long as said switch remains in one of its operative positions.

Depending upon the particular application of the inventive circuit, the switching device may represent a gate for reversal of the motor rotation in accordance with the respective operative positions of the switch, or, it may represent a gate for selective energizing and fast stopping of the motor in accordance with switching operations performed with said switch. The circuits according to the invention may serve for selectively stopping and reversing single-phase A.C. motors, or for only stopping the same.

The present invention also contemplates a novel motor control circuit which, again in an exemplary embodiment, features a switch, in a somewhat modified form, preferably of manual operation, a rectifier connectable in the energizing circuit of the motor, means for short-circuiting the rectifier means in the operative position of the switch, a switching device energized when said switch means is thrown into said operative position, and means for releasing said switching device.

The just releasing means, which can also form part of the previously mentioned motor control circuits wherein the switching device represents a gate, may be manually or relay-operated; also, the relay may be associated with the above-mentioned electrical or mechanical timing or time-delay means.

Other objects and advantages of the invention will be appreciated and more fully understood with reference to the following detailed description, when considered with the accompanying drawings, wherein FIG. 1 shows an electrical diagram of a proposed circuit according to the present invention, for reversing single-phase A.C. induction motors;

FIG. 2 shows a circuit derived from that of FIG. 1, and serving for both reversing and stopping A.C. motors of the above-mentioned kind;

FIG. 3 shows a modified detail of the circuit of FIG. 2, wherein a controlled rectifier is used in lieu of a diode;

FIG. 5 is yet another modification of the reversing and stopping circuit of FIG. 2, featuring auxiliary activating means;

FIG. 6 shows an alternative switch arrangement for the circuit of FIG. 2, to be used when the latter serves only for stopping A.C. motors; and FIG. 7 is a modified electrical circuit for stopping A.C. motors by the application of D.C.

Figure 1:
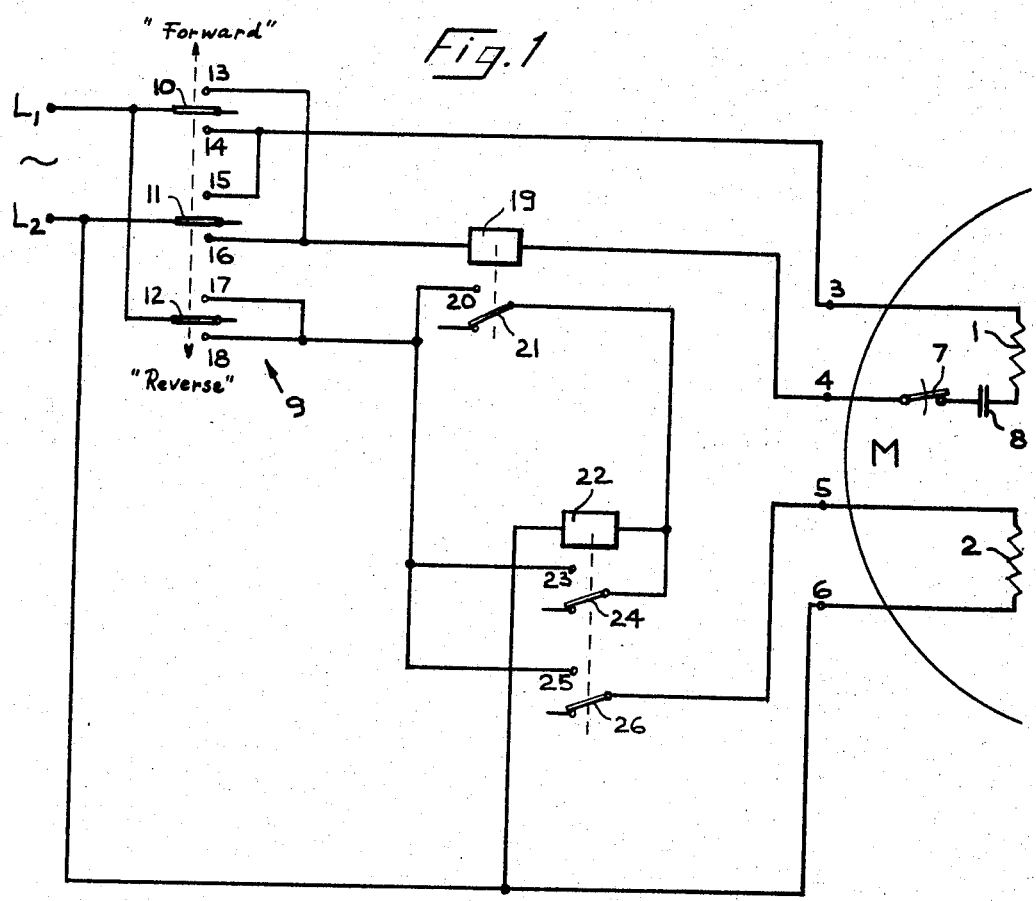

First, the basic circuit of FIG 1 will be described which serves for selectively reversing the direction of single-phase A.C. induction motors. $L_1$ and $L_2$ denote terminals of an A.C. power source (which also appears in FIGS. 2 and 5–7). The A.C. motor to be controlled is identified by M, and is shown with a starting winding 1 and a main or running winding 2, with respective terminal pairs 3 and 4 as well as 5 and 6. The starting winding 1 has associated therewith a conventional centrifugal switch 7, normally closed, and opened only when the motor has attained a predetermined running speed, and a series-connected capacitor 8. Any conventional auxiliary starting device may be provided for switch 7 in the inventive circuit.

Between the A.C. power source and the motor, the circuit comprises the following elements. A main switch 9 has three ganged double-throw circuits, namely 10, 11 and 12. FIG. 1 shows the disconnected or "OFF" position, while respective operative positions of the circuit are identified by "Forward" and "Reverse." The moving arms of switch portions 10 and 12 are connected to $L_1$ while the arm of switch portion 11 goes to $L_2$. In the "Forward" position, the respective switch arms connect to terminals or contacts 13, 15 and 17, while the "Reverse" position moves the same arms to contacts 14, 16 and 18.

From these contacts, 14 and 15 are interconnected and lead directly to terminal 3 of the motor starting winding 1; contacts 13 and 16 are also interconnected and go to a relay 19, serially interconnected in the path to terminal 4 of the motor starting winding 1. In the "Forward" mode, it is terminal $L_1$ which is connected to relay 19 and motor terminal 4, via contacts 10, 13 of the topmost switch circuit; in the "Reverse" mode, $L_2$ is connected to the same circuit elements via contacts 11, 16 of the central switch circuit. In each mode, the other A.C. terminal is directly connected to motor terminal 3 as clearly shown in the figure.

Relay 19 has a make switch having contacts 20 and 21 which energize a relay 22 in either operational mode from $L_1$, while the other terminal of the relay winding is connected to lead $L_2$. The latter is also directly connected to terminal 6 of the main motor winding 2. Relay 22 has a holding or self-locking circuit, with switch contacts 23, 24; there is also a second make switch with contacts 25, 26, which completes the supply circuit to terminal 5 of the main motor winding to $L_1$, whenever switch 9 is in one of the operational positions.

The operation of the circuit in FIG. 1 can be described as follows. Relay 19, in series with terminal 4 of the motor starting winding 1 and its centrifugal switch 7, is energized only when the starting winding is connected. The closed condition of switch 7 completes the circuit, once switch 9 is operated in either direction. Relay 19 will be energized as long as switch 7 does not open, which will occur upon the motor reaching a predetermined speed. Relay 22 is promptly energized by contacts 20, 21 and then holds itself via contacts 23, 24 even after relay 19 drops out. Relay 22 causes the main winding 2 to be energized.

When motor speed is sufficient to cause the centrifugal switch 7 to open, relay 19 drops out, but relay 22 remains energized (as is the main or running winding 2). The motor remains in operation as long as the position of switch 9 is unchanged. The manual movement of switch 9 from the "Forward" to the "Reverse" mode, or vice versa, is indicated when a rapid reversal of the motor rotation is desired. In an ordinary single-phase motor control system, when only the running winding or the starting winding is reversed, with the motor turning at rated speed and the starting switch or centrifugal switch is open, no effect is noted. The co-operative action of both starting and running windings 1, 2 is required to determine the sense of rotation. Here, then, is one of the important features of the present invention.

So long as switch 9 is in either of its operative positions, "Forward" or "Reverse," relay 19 monitors and its contacts 20, 21 duplicate the condition of the motor starting device, or centrifugal switch 7. Relay 19 thus is capable of energizing relay 22 and hence, via the contacts 25 and 26, of energizing the motor running circuit 2.

When switch 9 is moved from either of its operative positions, relay 22 is de-energized. Relay 22 cannot be re-energized except by the co-operative action of switch 9 and relay 19. Thus, should switch 9 be rapidly thrown from one of its operative positions to the other, relay 22 releases and cannot be re-energized until motor M has slowed down sufficiently to cause switch 7 to reclose. This arrangement permits re-connection of the running winding 2 only after the starting winding 1 has actually been energized by connection to the power supply in the reversed direction, at which time the two energized windings can co-operate in reversing the direction of rotation.

Having thus described the basic and relatively simple motor control circuit of FIG. 1, serving for the safe and automatic reversing of A.C. motors (for example, induction-type motors), we come now to FIG. 2 which shows a circuit derived from the previous one, and serving for both reversing and stopping A.C. motors. For the sake of clarity, the motor M is only shown with its pairs of terminals 3, 4 and 5, 6, but is understood to have the same starting and running windings and centrifugal or other starting switch as described before. Most of the described circuit elements are present, have identical reference numerals, and need not be explained again. Unlike circuit elements will be identified, as the description proceeds.

Relay 19 here has a double-throw switch, the movable contact arm 21 of which serves to switch over from a contact 27 to the other contact 20 which, in this case, does not derive its supply from the lowermost circuit of switch 9, as in FIG. 1, but directly from $L_2$. Instead, it is relay 22 which is now fed from the switch 9, and so is a contact 28 (the counterpart of contact 25 in FIG. 1) which is associated with the movable contact arm 26, leading to the motor terminal 5. In the de-energized condition of relay 22, contact 26 is connected to a contact 29 which leads to a circuit to be described hereunder in more detail.

A relay 30 is connected between line $L_1$ and contact 27 of relay 19, by the intermediary of a normally closed switch 31 which is here shown for manual operation. Relay 30 also has a self-locking circuit, with switch contacts 32, 33 and another make switch with contacts 34, 35. The latter apply A.C. from $L_1$, when relay 30 is energized, to a diode or the like unidirectional-flow element 36, serially connected in the path leading to contact 29 of relay 22 (and thence to terminal 5 of the main motor winding). Optionally, a second diode or the like element 37 may be connected to the junction of diode 36 and contact 29, thus shunting the main winding (as long as relay 22 is in its rest position). The supply path to the main motor winding is in this instance completed only when relay 30 is energized and relay 22 is at rest.

The operation of the control circuit of FIG. 2 is as follows. Relays 22 and 30 serve to "remember" the previous state of the system, and to control the direction of motor operation in accordance with the prevailing position of switch 9 at the respective times. During normal motor running, both relays 22 and 30 are energized. When switch 9 is moved to another position, relay 22 opens, while relay 30 alone is operated during the braking cycle. This takes place upon moving the switch 9 from one of the operative positions to the other, or to the "Off" position. The manual switch 31, or its more sophisticated equivalent to be described later, is used to terminate the braking at an appropriate time. The diodes 36, 37 are used to rectify the A.C. line power and provide D.C. for braking the main motor winding, when this is required. Diode 36 is in series, and diode 37 is in parallel with the motor winding.

Switch 9 is the only component which may be controlled by a human operator in normal operation (apart from switch 31 to which further reference will be had later). Assuming that the switch is moved up, to the "Forward" mode of motor operation (as viewed in the drawing), the circuit of the starting winding is completed through contacts 10, 13 and 11, 15 of switch 9, the centrifugal switch 7 being closed (because the motor does not yet run). When the series-connected relay 19 operates, its switch contacts 20, 21 cause relay 22 to operate. The latter locks itself by means of contacts 23, 24, and causes the main motor winding to be energized, through terminals 5, 6, by way of contacts 26, 28 and the (already closed) contacts 12, 17 of switch 9. Note that the contact 28, with one terminal of relay 22 connected thereto, returns to $L_1$ via said contacts 12, 17. This is important in another phase of operation. Relay 30 is prevented from operating because switch 21, 27 opens before 20, 21 are closed.

With relays 19, 22 operated, the motor is able to start and to run. When the speed is sufficient to cause the centrifugal switch or equivalent starting device to open, the starting winding is deenergized and relay 19 drops out. Since at this point relay 22 is operated, the circuit of relay 30 is completed to $L_2$ via the closed switch 31, switch 21, 27 at rest at relay 19 and switch 23, 24 already made on relay 22. Thus relay 30 pulls in when the centrifugal switch opens, and locks itself on through its switch 32, 33. This makes the release of relay 30 independent of any circuit action other than the operation of switch 31. The control circuit continues in operation with relays 22 and 30 energized and the motor running until the position of switch 9 is changed.

Let us assume that the switch 9 is brought back from one of the operative positions to the "Off" position. Opening of the contacts 12, 17 removes the return path of relay 22, also open-circuiting the power supply to the motor running winding when contacts 26, 28 are opened, after relay 22 dropped out. Contacts 26, 29 now connect the motor terminal 5 to the junction of diodes 36, 37, supplying the main winding with D.C. rectified by these diodes, from power supplied by contacts 34, 35 of the still closed relay 30. Diode 36 serves as the rectifier, while optional diode 37 serves to absorb the inductive reverse voltage produced when the line polarity reverses. After a time period considered sufficient by the operator for the braking to become effective, switch 31 is manually opened, causing relay 30 to drop out, interrupting the supply of D.C. current to the motor by breaking the circuit at contacts 34, 35. During this last cycle of operations the state of relay 19 is unimportant.

It is known that an A.C. motor may be stopped by the application of D.C. current to its windings. The rotor of a squirrel-cage machine then acts as a generator where the windings provide the D.C. field. Since the rotor of such a squirrel-cage motor has a low resistance, large currents tends to flow. These currents have the dual effect of producing a large reactive force which tends to prevent shaft rotation, and causing the inertial rotor energy to be dissipated in the rotor conductors in the form of heat.

The motor could also be stopped, according to a modified feature of the invention (not illustrated), by placing a diode or a capacitor across its windings, e.g. terminals 3, 4 and/or 5, 6. This, however, produces a retarding torque which reduces with reducing speed, and results in no positive torque at standstill. The use of a D.C. current, as shown in the circuit of FIG. 2, produces considerable holding torque at standstill.

One can also assume a movement of switch 9 from one operative position to the other (without actually stopping at the "Off" position). This motion of the control handle is advisable when a rapid reversal is desired. In an ordinary single-phase motor control system, when only the running winding or the starting winding is reversed with the motor turning at rated speed, no effect is noted. The co-operative action of both starting and running windings is required to determine the sense of rotation. Here, then, is another one of the important features of the present invention, as embodied in the control circuit of FIG. 2.

If the motor has been running with the switch 9 in the top or "Forward" position, relays 22 and 30 are energized. Actuation of switch 9 to the bottom or "Reverse" position causes movable arm 10 to be switched over from contact 13 and 14, and so on. When arm 12 leaves contact 17, relay 22 begins to drop out. The release of the locking contacts 23, 24 is made to be much swifter than the re-connection of relay 22 by means of 12, 18. That is, relay 22 drops out in less time than it takes the arm 12 to move from contact 17 to 18; this requirement is easily met by nearly all types of relays and switches.

When relay 22 is de-energized, the system is in its stopping mode of operation, as described before, and is independent of the position of switch 9 as long as relay 19 remains de-energized. Thus, the stopping action continues to the point at which the motor speed diminishes so much that the centrifugal switch recloses. At this point relay 19 again pulls in (one should recall that switch 9 is again in one of the operative positions). This causes relay 22 to pull in again, and the contact 26, that is terminal 5 of the main winding, is transferred from the source at contact 29 at the junction of diodes 36, 37 to the power line $L_1$ via switch circuit 12, 18, by the action of contact 26 being moved over from 29 and 28. Thus the motor restarts in the opposite direction by the reversing action of switch 9.

FIG. 3 shows a modified detail of the circuit of FIG. 2, namely the use of a controlled rectifier 38 in lieu of diode 36. A variable resistor 39 is connected across the anode and the gate, while an appropriately dimensioned capacitor 40 shunts the gate and the cathode of the rectifier 38.

This is merely an example of the simplest and most basic of many circuit variations in which a controlled rectifier can be substituted for the rectifier 36. By the use of a controlled rectifier, the amount, the rate of application and the timing of the application of D.C. to the motor winding can be readily controlled and varied by components operating at a power level much lower than that of the motor itself.

Use of the controlled rectifier permits the application of direct current to the motor in a programmed or predetermined manner, such as by the use of an external program generator (not shown) or by a device which is connected to or driven or controlled by the motor or the load. Such control would, in the simplest instance, be by means of varying the resistance of the variable resistor 39.

A further advantage to the use of the controlled rectifier is that it can be used to reduce the intensity of the current carried by contacts 34, 35 of relay 30, before said relay is de-energized. This aids in extending the life of the contacts.

Figure 4:
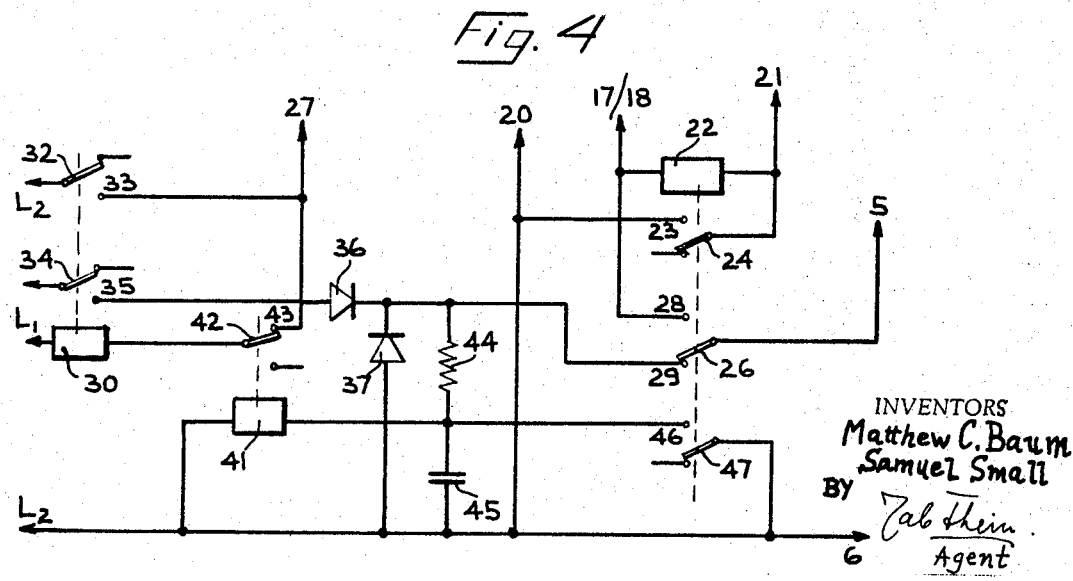
FIG. 4 is another modification of FIG. 2, wherein a timer circuit is used in conjunction with a special relay.

FIG. 4 shows another modification or enlargement of the control circuit of FIG. 2, wherein a timer circiut is used in conjunction with another relay. The manual switch 31 of FIG. 2 is replaced by a relay 41 having a break contact 42, 43 in the path between relay 30 and switch contact 27 of relay 19. While one terminal of relay 41 is connected to $L_2$, the other goes to the junction point of a resistor 44 and a capacitor 45, forming together a time-delay circuit between $L_2$ and the junction point of diodes 36. 37. The other terminal of relay 41 is further connected to yet another make contact of relay 22, including poles or contacts 46 and 47.

Operation of relay 30 causes a small current to flow, via contacts 34, 35, through the diode 36 and to the resistor 44 in the time-delay circuit. Since relay 22 at this stage is energized, the terminals of relay 41 are short-circuited at 46, 47 so that capacitor 45 cannot charge, and there is no further effect. The circuit continues in operation with relays 22 and 30 energized and the motor running.

When relay 22 drops out but relay 30 is still energized, contacts 46, 47 also open, permitting D.C. to flow into the parallel combination of relay 41 and capacitor 45. After the time determined by the parameters of the time-delay circuit and relay 41, the latter is energized. This causes relay 30 to drop out (interruption at contacts 42, 43), interrupting the supply of D.C. current to the motor by breaking the circuit at contacts 34, 35. The state of relay 19 is again unimportant in this operation. The time cycle is set so that the motor M is brough to full stop by the braking action of the D.C. current before said current is interrupted. It will be understood that the time-delay circuit 44, 45 may be made adjustable, and may also include or consist of other electrical elements.

The elements 41 through 47 of FIG. 4 can be replaced by other means for releasing relay 30, e.g. by mechanical, electrical, electronic or other means, or combinations thereof, and which may operate in conjunction with each other, as for instance, when such means is operated or controlled by an attachment to the motor shaft or to the load. The simplest form is, of course, given by the provision of switch 31 in FIG. 2 which is operated manually.

FIG. 5 represents yet another modification of the reversing and stopping circuit of FIG. 2, wherein auxiliary activating or safety means are added. The A.C. line terminals $L_1$, $L_2$ are shown connected to the manual switch 9, as usual; the latter has its three ganged double-throw circuits, with contacts 10–18 including the three switch arms. Each of the contacts 14, 16 and 18 has a normally closed switch or circuit breaker 48, 49 and 50 associated therewith, respectively. These switches are individually and optionally controlled by common (or alternatively separate) auxiliary activating means 51, only schematically shown in the drawing in block form. The leads going to motor terminal 3 and relay 19 are cross-linked to the "make" contacts of the respective switches, while both positions of switch 50 feed relay 22 (just as both contacts 17, 18 perform the same function directly in the circuit of FIG. 2).

The auxiliary means 51 may include conventional circuit elements performing the intended switching functions, and may be remote-controlled, associated with the motor under control, and may also comprise separate sections for the switches 48–50. The latter would then be operated independently or simultaneously, as the operating, safety or other considerations may necessitate. The control circuit which has the modification of FIG. 5 incorporated therein, naturally performs like the one described in connection with FIG. 2; also, the modifications of FIGS. 3, 4 and/or 6 (the latter to be described hereafter) are fully compatible with this circuitry.

FIG. 6 shows a simplified, alternative switch arrangement for the circuit of FIG. 2, to be used when the control circuit serves only for stopping A.C. motors (without need for the reversing feature). In lieu of the previously shown and described switch 9, a simpler switch 52 is used which has three ganged breaking circuits 10 and 14, 11 and 16, as well as 12 and 18. The stopping or braking action by the application of D.C. current is the same as described; however, the switch 52 has only two positions, namely an "On" and an "Off" position, and there is no need for crosslinking connections, as shown in FIGS. 1, 2 and 5 between the contacts 13 and 16, 14 and 15, as well as 17 and 18.

Finally, FIG. 7 illustrates a modified control circuit for stopping A.C. motors by the application of D.C. The circuit comprises a ganged, two-element switch 53 having contacts 54, 55, 56 and movable contact arms 57, 58. The new part of the circiut also comprises a relay 59 with a single make circuit 60, 61. The circuit of this figure also features the diode 36, the optional shunt diode 37, and the relay 41 having the break contacts 42, 43 as well as the time-delay elements 44, 45 associated therewith. For the sake of clarity, the motor M is shown here with one pair of terminals 62, 63 only. The interconnection of the circuit elements is clear from the figure and from the already known details of the foregoing description of FIGS. 1–6.

The circuit of FIG. 7 is similar in operation to a portion of the circuit of FIG. 2. The upper position of switch 53 is the "On" position, while the lower one is "Off." When the switch is moved to the "On" position, the motor M is connected across the line terminals $L_1$, $L_2$ by closing of the contacts 54, 57; at the same time, contacts 55, 58 short-circuit the series-connected diode 36. At this time, relay 59 pulls in, via rest contacts 42, 43 and the operated switch circuit 54, 57. The self-locking contacts 60, 61 of relay 59 bridge the switch circuit 54, 57, making the switch 53 ineffective in disconnecting either the motor M or the relay 59 from the line. Under these conditions the motor runs normally until further action is taken.

When the motor is to be stopped, switch 53 is moved to the lower "Off" position so that the circuit 54, 57 opens, which has no immediate effect since relay contacts 60, 61 are closed. The other circuit, with movable contact arm 58, unshorts the diode 36 so that the same is now in series with the motor. This is similar in its result to the combined operation of relays 22 and 30 in the circuit of FIG. 2. The above-mentioned series connection causes D.C. to flow through the motor, effectively braking it, as has been explained before.

The same action of switch 53 to the "Off" position places the time-delay elements 44, 45, and the parallel diode 37, into the supply path from $L_1$, through contacts 56, 58, in series with the diode 36 and contacts 60, 61. The relay 41 is again linked to the junction point of the time-delay elements so that it will operate after a suitable time, determined by the selection of values for the relay 41, the resistor 44 and the capacitor 45. This opens the circuit at 42, 43 so that relay 59 releases and interrupts the main supply at 60, 61. The circuit is now in the disconnected condition.

In this last embodiment of the inventive motor control circuit, the series diode 36 may also be replaced by a controlled rectifier and appropriate circuitry, such as that shown in FIG. 3, with the same advantage as described above.

The foregoing disclosure relates only to preferred embodiments of the invention which is intended to include all changes and modifications of the exemplary circuits de-

What we claim is:

1. A motor stopping and reversing circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and two operative positions for selectively energizing the motor in forward and reverse directions, current sensing means serially connected with a portion of said switch means and with said starting switch, and energized when the latter is in said closed position while said switch means is in one of said operative positions, and switching means triggered for energization by the operation of said current sensing means, for energizing at least the other one of said windings as long as said switch means remains in one of said operative positions, wherein said switching means includes means for applying a D.C. current to said at least other winding in the non-energized condition of said switching means, and said means for applying a D.C. current includes at least one controlled rectifier serially connectable with said at least other winding.

2. A motor stopping and reversing circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and two operative positions for selectively energizing the motor in forward and reverse directions, current sensing means serially connected with a portion of said switch means and with said starting switch, and energized when the latter is in said closed position while said switch means is in one of said operative positions, and switching means triggered for energization by the operation of said current sensing means, for energizing at least the other one of said windings as long as said switch means remains in one of said operative positions, wherein said switching means includes means for applying a D.C. current to said at least other winding in the non-energized condition of said switching means, said means for applying a D.C. current includes rectifier means serially connectable with said at least other winding, and further comprising auxiliary actuating means for influencing at least part of the stopping and reversing circuit independently from the condition of said switch means.

3. A motor stopping and reversing circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and two operative positions for selectively energizing the motor in forward and reverse directions, current sensing means serially connected with a portion of said switch means and with said starting switch, and energized when the latter is in said closed position while said switch means is in one of said operative positions, and switching means triggered for energization by the operation of said current sensing means, for energizing at least the other one of said windings as long as said switch means remains in one of said operative positions, wherein said switching means includes means for applying a D.C. current to said at least other winding in the non-energized condition of said switching means, and said means for applying a D.C. current includes at least one serially and one parallel connected rectifier.

4. A motor stopping and reversing circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and two operative positions for selectively energizing the motor in forward and reverse directions, current sensing means serially connected with a portion of said switch means and with said starting switch, and energized when the latter is in said closed position while said switch means is in one of said operative positions, and switching means triggered for energization by the operation of said current sensing means, for energizing at least the other one of said windings as long as said switch means remains in one of said operative positions, wherein said switching means includes means for applying a D.C. current to said at least other winding in the non-energized condition of said switching means, said means for applying a D.C. current includes relay means energized by the simultaneous operation of said current sensing means and said switching means, said relay means includes a self-locking circuit operative upon momentary energization in the non-energized condition of said current sensing means and simultaneous energized condition of said switching means, and means for releasing said self-locking circuit, said releasing means includes time-delay means triggered in the non-energized condition of said switching means, and wherein said time-delay means includes a resistor and a capacitor in series connection, and second relay means connected to the junction point of said resistor and said capacitor.

5. The circuit as defined in claim 4, wherein said switching means includes means for short-circuiting said second relay means upon energization of said switching means.

6. A motor stopping circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and an operative position for energizing the motor, current sensing means serially connected with a portion of said switch means and with said starting switch, and energized when the latter is in said closed position while said switch means is in operative position, and switching means triggered for energization by the operation of said current sensing means, for energizing at least the other one of said windings as long as said switch means remains in said operative position, wherein said switching means constitutes a gate for energization and fast stopping of the motor and includes a holding circuit operative upon momentary energization by said current sensing means, and said switching means further includes means for applying a D.C. current to said at least other winding in the non-energized condition of said switching means, said means for applying a D.C. current tifier.

7. The circuit as defined in claim 6, wherein said means for applying a D.C. current also includes parallel connected rectifier means.

8. A motor stopping circuit for a single-phase A.C. motor having at least two windings and a starting switch in series with at least one of said windings, said starting switch having a normally closed rest position and an actuated open position into which it is moved when the motor has attained a predetermined running speed; the circuit comprising, in combination, switch means having an inoperative position and an operative position for energizing the motor, current sensing means serially connected with a portion of said switch means and with said starting switch and energized when the latter is in said closed position while said switch means is in said operative position, and switching means triggered for energization by the operation of said current sensing means, for energizing at least the other one of said windings as long as said switch means remains in said operative position, wherein said switching means constitutes a gate for energization and fast stopping of the motor and includes a holding circuit operative upon momentary energization by said current sensing means, and said switching means further includes means for applying a D.C. current to said at least other winding in the non-energized condition of said switching means, said means for applying a D.C. current including serially connected rectifier means and relay means energized by the simultaneous operation of said current sensing means and said switching means, said relay means includes a self-locking circuit operative upon momentary energization in the non-energized condition of said current sensing means and simultaneous energized condition of said switching means, and means for releasing said self-locking circuit, said releasing means includes time-delay means triggered in the non-energized condition of said switching means, and said time-delay means includes a resistor and a capacitor in series connection, and second relay means connected to the junction point of said resistor and said capacitor.

9. The circuit as defined in claim 8, wherein said switching means includes means for short-circuiting said second relay means upon energization of said switching means.

References Cited

UNITED STATES PATENTS

| | | | |
|---|---|---|---|
| 2,459,479 | 1/1949 | Weinland | 318—207 |
| 2,545,639 | 3/1951 | Wolff et al. | 318—221 XR |
| 2,674,710 | 4/1954 | Pitman | 318—221 XR |
| 3,009,088 | 11/1961 | Prouty | 318—207 |
| 3,233,158 | 1/1966 | Gilbert | 318—212 |
| 3,305,714 | 2/1967 | Plumpe | 318—212 |

ORIS L. RADAR, *Primary Examiner.*

G. Z. RUBINSON, *Assistant Examiner.*

PO-1050
(5/69)

UNITED STATES PATENT OFFICE
CERTIFICATE OF CORRECTION

Patent No. 3,412,304          Dated November 19, 1968

Inventor(s) Matthew C. Baum et al.

It is certified that error appears in the above-identified patent and that said Letters Patent are hereby corrected as shown below:

Column 10, line 49 (claim 6), after "in" insert -- said --; and column 10, lines 60 and 61 (claim 6), change "... a D.C. current tifier." to -- ... applying a D.C. current including at least one serially connected controlled rectifier. --.

SIGNED AND
SEALED
JAN 27 1970

(SEAL)
Attest:

Edward M. Fletcher, Jr.
Attesting Officer

WILLIAM E. SCHUYLER, JR.
Commissioner of Patents